United States Patent [19]
Kothmann

[11] 4,324,844
[45] Apr. 13, 1982

[54] VARIABLE AREA FUEL CELL COOLING

[75] Inventor: Richard E. Kothmann, Churchill Borough, Pa.

[73] Assignee: Westinghouse Electric Corp., Pittsburgh, Pa.

[21] Appl. No.: 144,090

[22] Filed: Apr. 28, 1980

[51] Int. Cl.³ .......................................... H01M 8/04
[52] U.S. Cl. ....................................... 429/26; 429/34; 429/120
[58] Field of Search ............................ 429/26, 34, 120

[56] References Cited

U.S. PATENT DOCUMENTS

| | | | |
|---|---|---|---|
| 3,160,528 | 12/1964 | Dengler et al. | 136/86 |
| 3,432,357 | 3/1969 | Dankese | 136/86 |
| 3,468,712 | 9/1969 | Gillespie | 136/86 |
| 4,002,493 | 1/1977 | Warszowski | 429/26 |
| 4,009,320 | 2/1977 | Gerbier | 429/27 |
| 4,049,878 | 9/1977 | Lindstrom | 429/18 |
| 4,074,020 | 2/1978 | Regnout | 429/34 |
| 4,101,718 | 7/1978 | Tamura | 429/26 |
| 4,129,685 | 12/1978 | Damiano | 429/38 |
| 4,169,917 | 10/1979 | Baker et al. | 429/26 |
| 4,182,795 | 1/1980 | Baker et al. | 429/13 |

Primary Examiner—Charles F. Lefevour
Attorney, Agent, or Firm—Z. L. Dermer

[57] ABSTRACT

A fuel cell arrangement having cooling fluid flow passages which vary in surface area from the inlet to the outlet of the passages. A smaller surface area is provided at the passage inlet, which increases toward the passage outlet, so as to provide more uniform cooling of the entire fuel cell. The cooling passages can also be spaced from one another in an uneven fashion.

5 Claims, 19 Drawing Figures

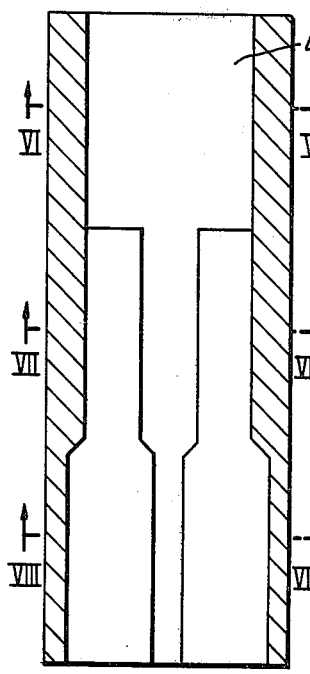
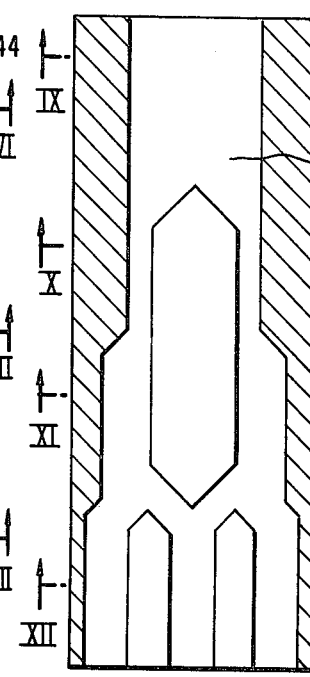
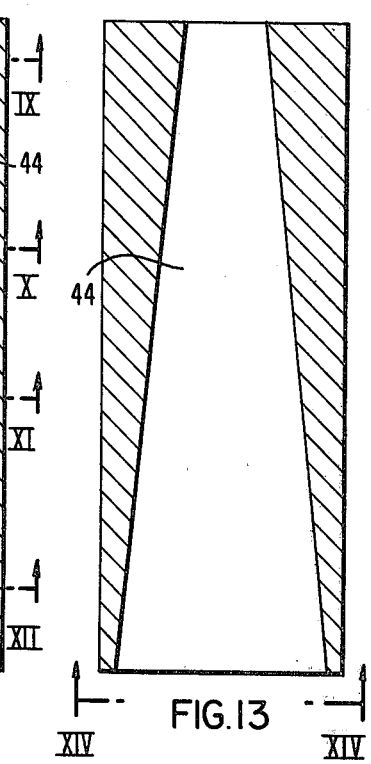
FIG. 18  FIG. 19  FIG. 13
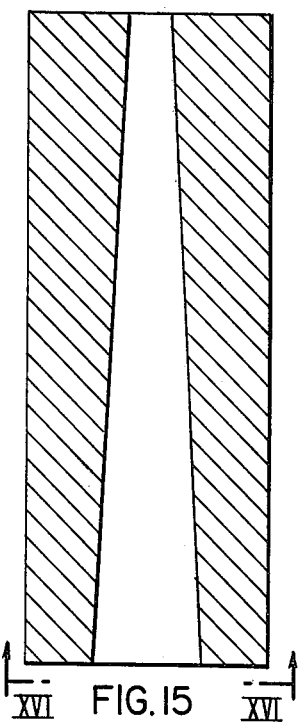
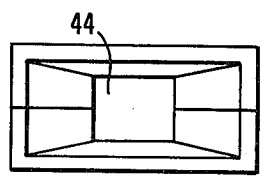
FIG. 14
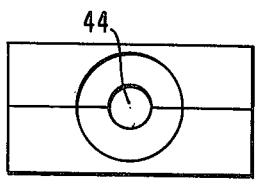
FIG. 16
FIG. 15

VARIABLE AREA FUEL CELL COOLING

GOVERNMENT CONTRACT

This invention was made or conceived in the course of, or under, a contract with the U.S. Government, identified as ET-78-C-03-2031.

CROSS-REFERENCE TO RELATED APPLICATIONS

This disclosure is closely related to concurrently filed U.S. patent application in the name of R. E. Kothmann, entitled "Variable Area Fuel Cell Process Channels," further identified by Ser. No. 144,088 now U.S. Pat. No. 4,292,379, and concurrently filed U.S. patent application in the name of R. E. Kothmann and J. A. Cyphers, entitled "Fuel Cell System Configuration", further identified by Ser. No. 144,089 now U.S. Pat. No. 4,276,355, both of which are hereby incorporated by reference.

BACKGROUND OF THE INVENTION

Description of the Prior Art

Among the various types of fuel cell systems are those which include subassemblies of two bipolar plates between which is supported an electrolyte, such as an acid, in a matrix. The subassemblies, herein referred to as fuel cells, are oriented one atop another and electrically connected in series to form a fuel cell stack. Operation of the fuel cell, for example the reaction of hydrogen and oxygen to produce electrical energy as well as water and heat, is exothermic, and cooling of the cell components is necessary in order to maintain component integrity. For example, the bipolar plates or the electrolyte matrix may be made of carbonaceous material bonded by a resin which tends to degrade at high temperatures. Prolonged operation at high temperatures would tend to degrade many components of a typical fuel cell. Further, the exothermic reaction can result in uneven temperature distribution across a fuel cell, thus limiting cell-operating temperature and efficiency, and additionally raising concerns about catalyst poisoning, for example, by carbon monoxide.

Accordingly, fuel cell systems have in the past been proposed with closed liquid cooling loops. Typically proposed are systems comprising a plurality of stacked cells where every fourth cell or so includes small metallic tubing through which cooling water is recirculated. Circulatory power is accordingly required, detracting from overall cell efficiency. This is complicated by large pressure drops in small diameter tubing, and the susceptibility of the cooling tubes to attack by mediums within the cell stack, such as acids in certain designs.

Also proposed are systems wherein large amounts of an oxidant, such as air, in quantities which are multiples of the stoichiometric amount necessary to carry out the electrochemical reaction, are circulated through a stack of fuel cells to additionally function as a cooling medium. As with liquid-cooled systems, an associated penalty is the large amount of circulatory power required.

More recently proposed have been systems including a stack of fuel cells with a cooling module placed between every fourth or so fuel cell in the stack. Air is manifolded so as to flow in parallel through the process oxidant channels of the fuel cells, as well as through cooling passages of the cooling module. The cooling module passages are much larger than the fuel cell process channels so that approximately eighty percent of the air flows through the cooling cell passages and the balance through the process cell channels. While such systems represent an improvement in terms of mechanical power requirements, additional improvements can be made. For example, where the amount of airflow is reasonable, that is, where an amount which does not require excess circulatory power is utilized, the air flowing through the cooling channels absorbs substantial amounts of heat energy as the cooling passage is traversed, resulting in less cooling at the exit end of the channel. This condition results in an uneven temperature profile in the fuel cell stack and attendant unbalanced reaction rates, voltage and current distributions, and limits maximum operating temperatures.

It is therefore desirable to provide improved cooling arrangements for stacked fuel cell systems which preferably do not suffer excessively high pressure drops and circulatory power requirements and which provide for better temperature distribution throughout the fuel cell stack.

SUMMARY OF THE INVENTION

This invention provides a cooling arrangement for stacked fuel cell systems which alleviates unbalanced temperature distributions and does not require excessively high cooling fluid flow rates. In preferred form, a plurality of fuel cells are provided in a stack, and a cooling module is periodically positioned between two selected fuel cells. Process channels within the fuel cells are arranged to transfer an oxidant, such as air, through the cells in a direction preferably generally parallel to the flow of air through the passages of the cooling modules.

The cooling passages are substantially larger than the fuel cell process channels. The process channels are of generally constant cross section throughout their length, or can include a variable cross section as disclosed in the concurrently filed application. The cooling passages, however, are provided with a surface area that varies in a predetermined fashion from inlet to outlet. More specifically, the cooling passages are provided with a smaller cross-sectional and/or larger surface areas at the outlets. The cooling passage inlets are preferably arranged so that the inlets are along the side of the cell stack exposed to fresh oxidant, and the outlets are along the side of the cell stack exposed to depleted oxidant. The surface area of the cooling cell passages progressively increases from inlet to outlet. In this manner, as the cooling air traverses the cell passages absorbing heat energy and correspondingly lowering its cooling ability, it also contacts a larger surface area, correspondingly increasing its cooling ability. The net result is more evenly distributed cooling resulting in more uniform cell temperatures.

In addition to varying the cooling surface area of the passage with position along the flow path within the cell, the lateral distance among adjacent channels can also be advantageously varied to more closely match uneven reaction distribtuion which tends to be higher at the process fuel inlet end of the cell and lower at the process fuel outlet end of the cell.

There are a number of manners in which the surface area of the cooling passages can be varied, including branching the passages from a singular inlet to a plurality of preferably smaller outlets. The passage shape can also be modified, for example, from rectangular to cruciform. Substantially rectangular-based channel shapes are preferred in order to most advantageously match cooling requirements with distribution of heat generation.

BRIEF DESCRIPTION OF THE DRAWINGS

The advantages, nature and additional features of the invention will become more apparent from the following description, taken in connection with the accompanying drawings, in which:

FIGS. 13 and 15 are plan views, in cross section, of additional embodiments of cooling modules;

FIGS. 14 and 16 are views taken respectively at XIV—XIV and XVI—XVI of FIGS. 13 and 15;

FIGS. 18 and 19 are cross-sectional plan views of additional cooling module passage configurations.

DESCRIPTION OF THE PREFERRED EMBODIMENT

Figure 1:
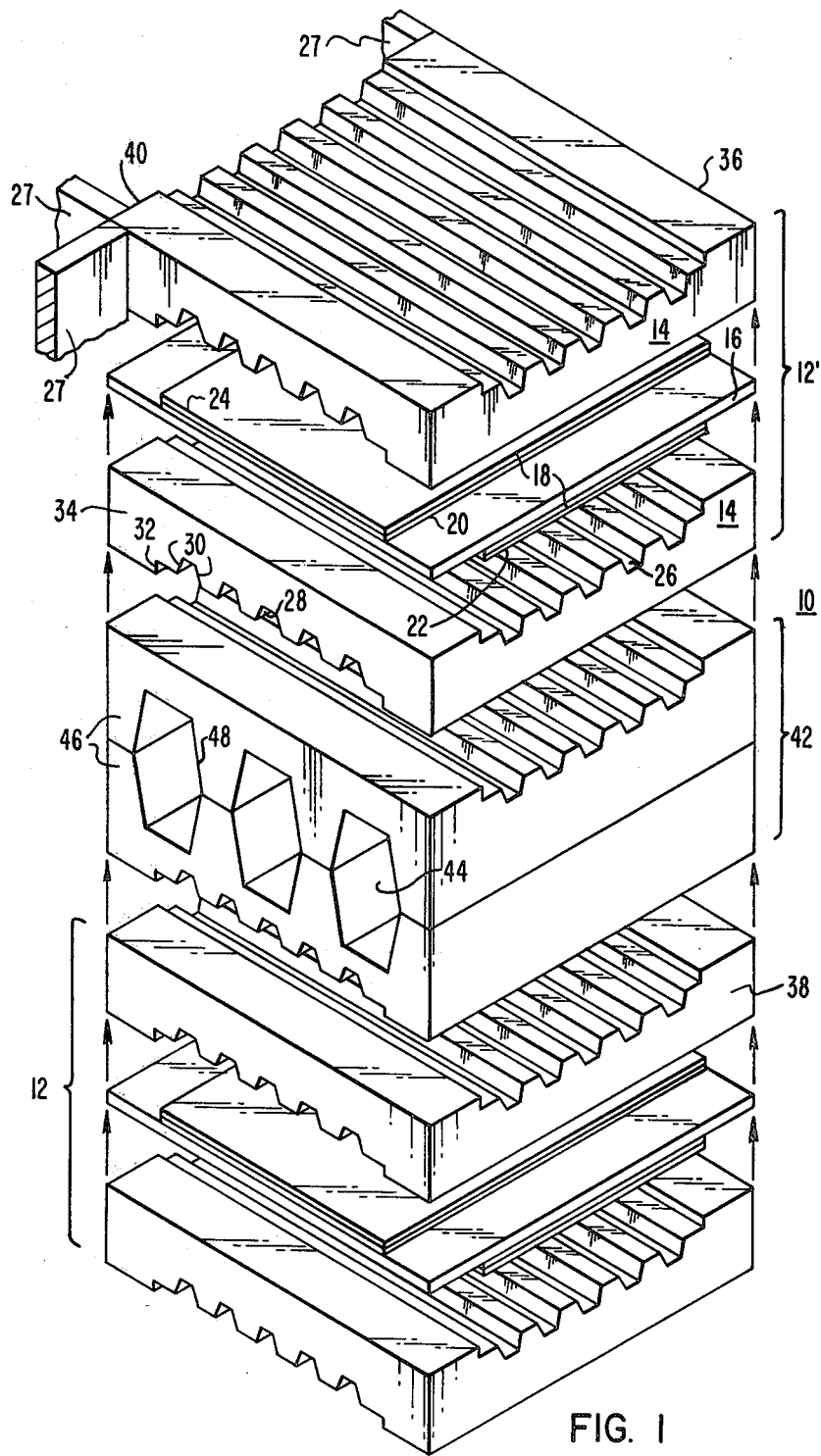
FIG. 1 is an expanded perspective view of a fuel cell stack in accordance with the invention.
Figure 3:
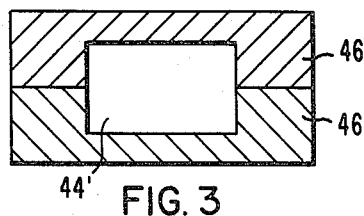
FIGS. 3, 4 and 5 are elevational section views taken respectively at III—III, IV—IV and V—V of FIG. 2.
Figure 4:
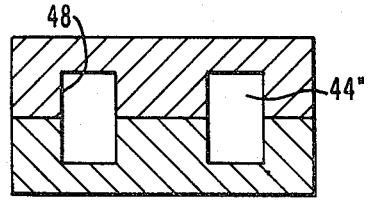
Figure 5:
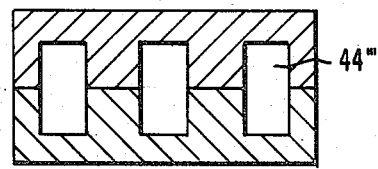
Figure 2:
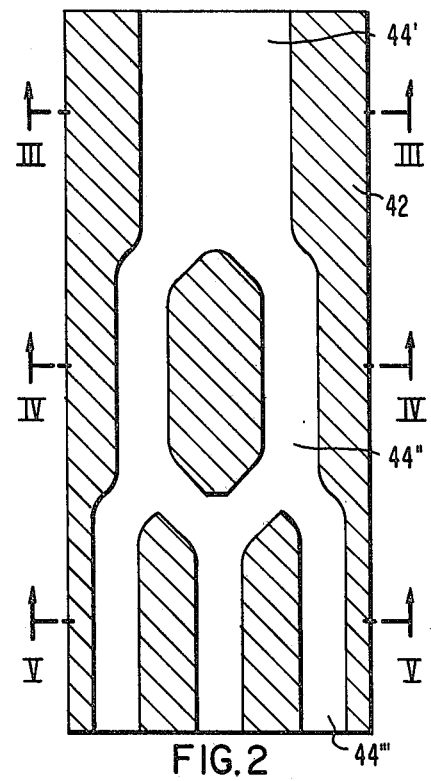
FIG. 2 is a plan view, in cross section, of a portion of a cooling module.

Referring now to FIG. 1, there is shown an electrochemical fuel cell system 10. The system includes a plurality of repeating fuel cells 12 arranged in a stack such that the cells 12 are electrically connected in series. Cell stacks can also be arranged in parallel.

An individual cell, such as the cell 12', includes two bipolar plates 14 between which are sandwiched an electrolyte, for example, in the form of a porous graphite matrix 16 saturated with an acid such as phosphoric acid. Many other materials and structures which incorporate an electrically insulating matrix material can also be utilized. The plates 14 can comprise a material such as compression molded graphite-resin composite, disposed on opposite sides of the electrolyte matrix 16 and electrodes 18, such as the cathode 20 and anode 22. Each electrode 18 can also be of a porous graphite material provided with a porous graphite fiber backing 24 for added structural integrity.

The bipolar plates 14 are provided with a set of process channels, including the fuel channels 26 and the oxidant channels 28. The channels 26, 28 are generally rectangular with slightly slanted edges 30 to facilitate fabrication as necessary, for example, to remove a fabrication die. The bipolar plates 14 also include grooves 32 matingly configured to receive the electrodes 18. Thus, when held together by means well known, such as bonding materials and an external frame, each cell represents a substantially sealed unit.

An oxidant, such as a halogen, or air or other oxygen-containing material, flows through the oxidant channels 28, and a fuel, such as hydrogen, organics or metals, flows through the fuel channels 26. Manifolds 27 are typically utilized to, for example, provide oxidant to the oxidant inlet side 34 of the cell system stack and to receive the oxidant from the oxidant outlet side 36 of the stack. Similarly, manifolds are provided on the fuel inlet side 38 and fuel outlet side 40. Electrical power and heat are generated by the interaction of the fuel and oxidant through the electrodes and electrolyte matrix 16. An exemplary fuel cell 13 utilizes hydrogen fuel, air as the oxidant and phosphoric acid as the electrolyte.

A substantial amount of heat is generated by the electrochemical reaction and, accordingly, the system stack 10 includes cooling modules 42. Dependent upon the operating temperatures desired, the cooling modules 42 are placed between fuel cells 12 at selected positions within the stack 10. A cooling module 42 may, for example, be placed between approximately every third cell to every eighth cell.

Each cooling module 42 is preferably comprised of a material similar to that of the bipolar plates 14, compression molded graphite-resin composite in the exemplary system. The cooling module 42 includes a plurality of passages 44, described more fully hereinafter. The cooling module 42 can be formed of one piece, although, as shown, two sections 46 are preferably separately fabricated and subsequently sealed together. The cooling passages 44 are preferably substantially rectangular, although other geometric shapes are equally possible. Where the cooling module is formed in two sections 46, cooling passage edges 48 are preferably slanted slightly, as are the fuel cell channels 28, approximately seven degrees from vertical, to accommodate removal of a die during fabrication.

The cooling passages 44 are preferably oriented generally parallel to the oxidant channels 28, although they can also be oriented parallel to the fuel channels 26. The latter, however, requires more complex manifolding. A cooling fluid flows through the cooling passages 44. In preferred form the cooling fluid and oxidant are the same medium, such as air. Thus, with the configuration shown, air is brought from a singular manifold 27 to the oxidant inlet side 34 of the fuel cell system stack 10, and flows in parallel and in the same direction through the cooling passages 44 and oxidant process channels 28.

As the cooling air flows within the passages 44, heat generated by the electrochemical reaction is absorbed. In order to maintain a relatively constant temperature across the fuel cells 12 without excessively large cooling airflow rates, the surface area of the cooling passages 44 is varied with the distance from the inlet end of the passages. A small surface area is provided at the inlet end and a larger surface area is provided at the exit end. The increase in surface area can be provided in a number of manners, such as by changing the geometry or perimeter of a given passage as a function of distance, or by dividing the passages into additional branches along the direction of flow. The variation can either be continuous or can include step changes. The actual passage shape may be directed by fabrication preference.

A branching arrangement is shown in FIGS. 2 through 5. Here a cooling passage 44 includes a first segment having a singular branch 44', a second segment including two branches 44", and a third segment including three branches 44''', respectively, from inlet toward outlet. Each segment is approximately one-third of the length of the entire passage. The rectangular shape shown is preferred since it is relatively simple to fabricate and match with desired cooling requirements. The surface area defined by the branches 44', 44'', 44''', progressively increases.

Figure 6:
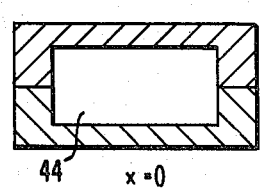
FIGS. 6, 7 and 8 are elevational section views, similar to FIGS. 3, 4 and 5, for another embodiment of the invention, taken respectively at VI—VI, VII—VII and VIII—VIII of FIG. 18.
Figure 7:
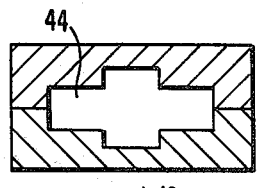
Figure 8:
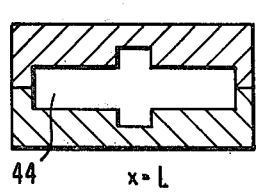
Figure 9:
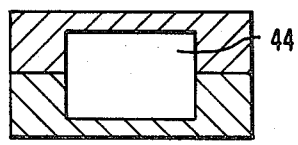
FIGS. 9, 10, 11 and 12 are similarly elevational section views of yet another embodiment, taken respectively at IX—IX, X—X, XI—XI and XII—XII of FIG. 19.
Figure 10:
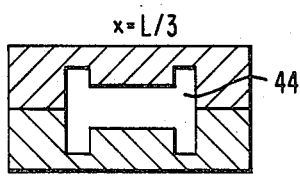
Figure 11:
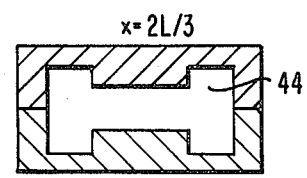
Figure 12:
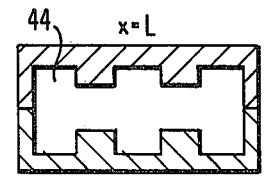

FIGS. 6 through 8 represent a series of segments, respectively, from inlet to outlet, where the geometry is modified to provide an increasing surface area. A similar sequence is shown in FIGS. 9 through 12. FIGS. 13 and 14 show a passage 44, rectangular in cross section, which gradually increases in surface area from inlet to outlet, and FIGS. 15 and 16 show a passage 44, circular in cross section, which gradually increases from inlet to outlet. Many additional configurations are equally possible.

Figure 17:
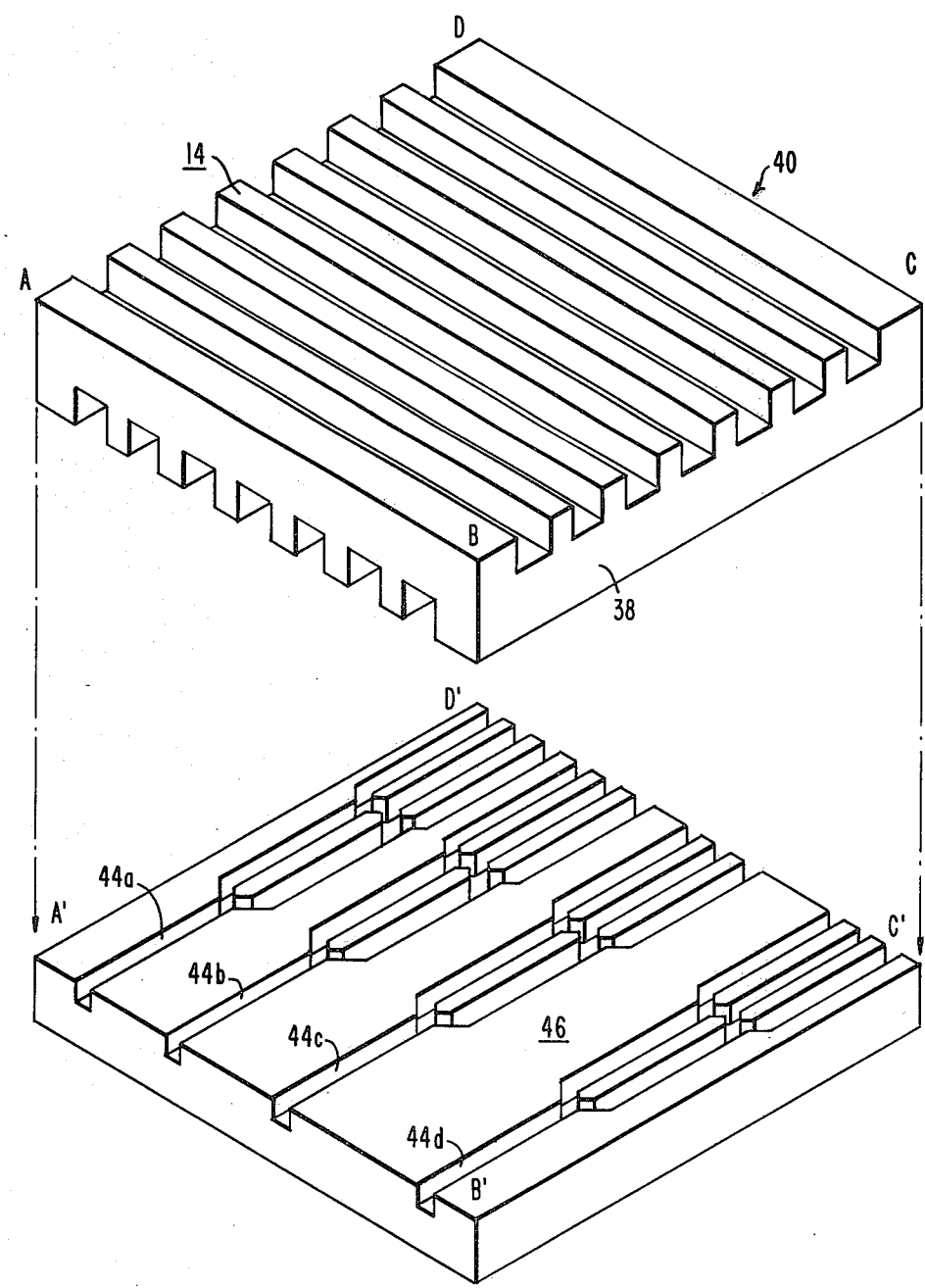
FIG. 17 is an expanded perspective schematic of selected portions of a fuel cell stack in accordance with another embodiment of the invention.

In addition to varying the surface area along the length of a passage to achieve a more even temperature distribution across the cells 12, adjacent passages can also be spaced laterally in a predetermined manner. Particularly, as shown in FIG. 17, cooling passages 44a and 44b are spaced closer together than, for example, passages 44c and 44d. As fuel traverses the channels 26 from inlet 38 to outlet 40, the fuel is gradually depleted. Accordingly, the heat generated by the exothermic reaction is greater at the fuel inlet 38 and less toward the fuel outlet 40. By spacing the cooling passages 44 so that more cooling air flows adjacent the fuel inlet and less cooling air flows at the fuel outlet, a more even temperature distribution across the cell is achieved.

The actual sizing, shaping and spacing of the cooling passages will vary with heat generation for any given cell system and with other factors affecting heat transfer such as the type and magnitude of cooling fluid flow. As an example of the change in surface area required across the cell, it is known that, where q(x) is the heat flux per unit area (Btu/ft$^2$-hr) generated in the bipolar plates, the temperature rise of the fuel cell channel above the local cooling air temperature is $$\Delta T = T_{p(x)} - T_{a(x)} = \frac{q(x)}{h(x)A(x)} \quad (1)$$

where A(x) is the cooling surface area per unit of plate area (dimensionless), h(x) is the local heat transfer coefficient (Btu/hr-ft$^2$-°F.), $T_{p(x)}$ is the bipolar plate temperature (°F.) and $T_{a(x)}$ is the local cooling air temperature (°F.).

The cooling air temperature satisfies the equation $$T_{a(x)} = T_{a(o)} + \frac{w}{mc_p} \int_0^x q(x)dx) \text{ and,} \quad (2)$$

$$T_{a(x)} = T_{a(o)} + \frac{wx\bar{q}(x)}{mc_p},$$

where w is the plate width, $T_{a(o)}$ is the temperature of the inlet cooling air (°F.), $\bar{q}(x)$ is the average flux from x=o to x, m is the mass flow rate of cooling air per plate (lb/hr), and $c_p$ is the specific heat of the cooling air (Btu/lb—°F.). Accordingly, $$T_{p(x)} = T_{a(o)} + \frac{wx\bar{q}(x)}{mc_p} + \frac{q(x)}{h(x)A(x)} \quad (3)$$

The bipolar plates can be at constant temperature, $T_{po}$, by setting $$U(x) = h(x)A(x) = \frac{q(x)}{T_{po} - T_{a(o)} - \frac{w}{mc_p} \int_0^x q(x)dx} \quad (4)$$

As a specific case for illustration, if the heat generated per unit area in the bipolar plates q(x) is constant, q, then the intensity of cooling factor $$U(x) = \frac{\bar{q}}{T_{po} - T_{ao} - \frac{wx\bar{q}}{mc_p}} \quad (5)$$

and $$\frac{U(L)}{U(O)} = \frac{T_{po} - T_{ao}}{T_{po} - T_{ao} - \Delta T_a}, \quad (6)$$

where $\Delta T_a$ is the temperature rise of the cooling fluid.

Thus, if the temperature difference between the inlet air and the corresponding portion of the adjacent bipolar plate is 100° F., and the cooling air temperature rises 75° F. while traversing the cooling passages, then the required ratio of surface area times heat transfer coefficient at the outlet, U(L), to surface area times heat transfer coefficient at the inlet, U(O), is $$\frac{100}{100 - 75} = 4:1.$$

This ratio is readily achieved by dividing a larger channel at the inlet into two or three channels at the exit, particularly as an intensity of cooling factor ratio of 4:1 does not require a 4:1 surface area ratio, since h will increase due to a smaller channel hydraulic diameter at the outlet.

It will be recognized by those skilled in the art that many cooling passage shapes are possible, and that hydraulic diameter is an important factor when selecting passage shape and surface area. Preferred shapes are those which reduce hydraulic diameter and simultaneously increase surface area so as to provide an increase in both the cooling area and the heat transfer coefficient, the intensity of cooling per unit area.

The cooling airflow which produces a 75° F. rise would result in approximately a 75° F. temperature variation among adjacent bipolar plates where cooling channel surface area variation, as disclosed, is not utilized. This temperature variation is reduced to approximately 25° F. with the disclosed surface area variation.

The advantages resulting from a more even temperature distribution are substantial, including the allowance of higher average bipolar plate temperature for a given maximum temperature. The disclosed system not only reduces the airflow required and accordingly the required circulator power, but further alleviates the effects of carbon monoxide catalyst poisoning which decreases with increasing operating temperature and, accordingly, is lessened by the higher average temperature.

Many modifications may be made in the above-described system without departing from the spirit and scope thereof. It thus is intended that all matter contained in the foregoing description be interpreted as illustrative, and not in a limiting sense.

I claim:

1. An improved electrochemical cell system of the type wherein two process fuel cells connected electrically are separated by a cooling module and a fluid oxidant is fed in parallel through process channels in said fuel cells and through cooling passages in said cooling module, said cooling passages having an inlet and an outlet, the improvement comprising:

said cooling passages being of a variable surface area per unit length which generally increases from said inlet to said outlet.

2. The system of claim 1 wherein said cooling passages are generally rectangular in cross section.

3. An electrochemical cell system including (a) a plurality of stacked fuel cells electrically connected in series, each said cell having an electrolyte and electrodes disposed between a pair of bipolar plates; oxidant channels defined by said bipolar plates disposed on one side of said electrolyte for allowing the passage of an oxidant adjacent said electrolyte, and fuel channels defined by said bipolar plates disposed adjacent an opposite side of said electrolyte for allowing the passage of a fuel adjacent said electrolyte; and (b) a cooling module disposed between two of said fuel cells, said module including a plurality of cooling passages disposed to allow passage of a cooling medium therethrough, said cooling passages having an inlet and an outlet, said cooling passages having a surface area per unit length which increases in a predetermined manner from said inlet to said outlet.

4. The electrochemical cell system of claim 3 wherein said oxidant and cooling passages are substantially parallel and further comprising means for flowing an oxidant through said oxidant channels and a cooling fluid through said cooling channels in generally the same direction.

5. The electrochemical cell system of claim 3 wherein said plurality of cooling passages are unevenly spaced from one another in a predetermined manner.

* * * * *